United States Patent
Evans et al.

(10) Patent No.: US 12,012,199 B2
(45) Date of Patent: Jun. 18, 2024

(54) ADJUSTABLE-ANGLE WINDSHIELD ASSEMBLIES, AIRCRAFT COMPRISING THE SAME, AND A METHOD OF ADJUSTING WINDSHIELD ANGLE OF SUCH AIRCRAFT

(71) Applicant: The Boeing Company, Chicago, IL (US)

(72) Inventors: Daren Evans, Marysville, WA (US); Nick A. Kovaltchouk, Woodinville, WA (US); Joshua R. Holcomb, Edmonds, WA (US)

(73) Assignee: The Boeing Company, Chicago, IL (US)

( * ) Notice: Subject to any disclaimer, the term of this patent is extended or adjusted under 35 U.S.C. 154(b) by 445 days.

(21) Appl. No.: 17/536,726

(22) Filed: Nov. 29, 2021

(65) Prior Publication Data
US 2023/0166827 A1     Jun. 1, 2023

(51) Int. Cl.
    *B64C 1/14*        (2006.01)

(52) U.S. Cl.
    CPC .................... *B64C 1/1476* (2013.01)

(58) Field of Classification Search
    CPC ........ B64C 1/1476; B64C 1/1492; B64C 1/28
    See application file for complete search history.

(56) References Cited

U.S. PATENT DOCUMENTS

| | | | | |
|---|---|---|---|---|
| 3,259,345 A | * | 7/1966 | Martignoni | B64C 1/1476 244/129.3 |
| 3,334,846 A | * | 8/1967 | Spivak | B64C 1/28 244/121 |
| 3,477,667 A | * | 11/1969 | Lock | B64C 1/1492 244/121 |
| 6,951,319 B2 | * | 10/2005 | Colich | B64C 1/1476 244/129.4 |
| 8,397,431 B2 | * | 3/2013 | Krahl | B64C 1/1492 244/129.3 |

OTHER PUBLICATIONS

Walter F. Grether, "Optical Factors in Aircraft Windshield Design as Related to Pilot Visual Performance", Aerospace Medical Research Laboratory Wright-Patterson Air Force Base, Ohio, National Technical Information Service U.S. Department of Commerce, Jul. 1973.
https://www.usinenouvelle.com/article/en-images-pour-ses-50-ans-ce-concorde-prend-un-coup-dans-le-nez.N804670.

* cited by examiner

*Primary Examiner* — Richard Green
(74) *Attorney, Agent, or Firm* — Quinn IP Law

(57) ABSTRACT

A windshield assembly comprises a support panel, a windshield, and a frame, surrounding the windshield. The frame comprises a frame inboard leg, which is in contact with an inboard windshield surface. A hinge pivotally couples a frame-inboard-leg top portion of the frame inboard leg to the support panel and has a pivot axis. A channel is provided in the support panel. At least a portion of the frame-inboard-leg bottom portion, at least a portion of the frame-inboard-leg first lateral portion, and at least a portion of the frame-inboard-leg second lateral portion are located in the channel. The channel comprises a channel base leg. A seal is located in the channel between the channel base leg and the frame inboard leg.

19 Claims, 9 Drawing Sheets

ADJUSTABLE-ANGLE WINDSHIELD ASSEMBLIES, AIRCRAFT COMPRISING THE SAME, AND A METHOD OF ADJUSTING WINDSHIELD ANGLE OF SUCH AIRCRAFT

TECHNICAL FIELD

Described herein are adjustable-angle windshield assemblies for aircraft and a method of adjusting the same.

BACKGROUND

Aircraft are provided with windshields to enable pilots to observe the external environment. Windshield angle relative to horizontal can affect aerodynamic drag as well as the pilot's ability to perceive the external environment. When windshield angle is higher, visibility through the windshield is less distorted, but increased drag is produced. Conversely, when windshield angle is lower, drag is decreased, but visibility is more distorted. Less distortion in visibility is desired during taxiing, take-off, and landing of the aircraft, while reduced drag is desired during cruising, particularly when the aircraft travels at supersonic or higher speeds.

SUMMARY

Accordingly, apparatuses and methods, intended to address at least the above-identified concerns, would find utility.

The following is a non-exhaustive list of examples of the subject matter, disclosed herein.

Disclosed herein is a windshield assembly, comprising a support panel. The windshield assembly further comprises a windshield, comprising an inboard windshield surface, an outboard windshield surface, and a windshield peripheral edge. The inboard windshield surface and the outboard windshield surface face in opposite directions relative to each other. The windshield peripheral edge circumscribes the inboard windshield surface and the outboard windshield surface. The windshield peripheral edge comprises a windshield-peripheral-edge top portion, a windshield-peripheral-edge bottom portion, spaced away from the windshield-peripheral-edge top portion, a windshield-peripheral-edge first lateral portion, extending between the windshield-peripheral-edge top portion and the windshield-peripheral-edge bottom portion, and a windshield-peripheral-edge second lateral portion, spaced away from the windshield-peripheral-edge first lateral portion and extending between the windshield-peripheral-edge top portion and the windshield-peripheral-edge bottom portion. The windshield assembly also comprises a frame, surrounding the windshield peripheral edge and comprising a frame inboard leg, which is in contact with the inboard windshield surface. The frame inboard leg comprises a frame-inboard-leg top portion, coupled to the windshield-peripheral-edge top portion, a frame-inboard-leg bottom portion, coupled to the windshield-peripheral-edge bottom portion, a frame-inboard-leg first lateral portion, coupled to the windshield-peripheral-edge first lateral portion, and a frame-inboard-leg second lateral portion, coupled to the windshield-peripheral-edge second lateral portion. The frame-inboard-leg top portion is linear. The windshield assembly additionally comprises a hinge, pivotally couples the frame-inboard-leg top portion to the support panel and having a pivot axis. The windshield assembly further comprises a channel, provided in the support panel. At least a portion of the frame-inboard-leg bottom portion, at least a portion of the frame-inboard-leg first lateral portion, and at least a portion of the frame-inboard-leg second lateral portion are located in the channel. The channel comprises a channel base leg, and a channel retention leg, spaced from the channel base leg. The windshield assembly also comprises a seal, located in the channel between the channel base leg and the frame inboard leg.

The windshield assembly of an aircraft comprises a windshield that is rotatable relative to the support panel so that the windshield angle can be adjusted depending on a mode of operation of the aircraft.

Also disclosed herein is a method of adjusting an angle of the windshield assembly. The method comprises selectively configuring the seal to the contracted state, so that the frame is oriented at the first frame angle relative to the virtual reference plane, containing the pivot axis of the hinge, or to the expanded state, so that the frame is oriented at the second frame angle relative to the virtual reference plane, containing the pivot axis of the hinge.

Selectively configuring the seal to the contracted state places the frame in a first frame angle that improves visibility through the windshield during taxiing, take-off, and landing. Selectively configuring the seal to the expanded state places the frame in a second frame angle that reduces drag during cruising.

Also disclosed herein is an aircraft, comprising the windshield assembly and a skin portion that defines a windshield opening. The windshield assembly extends over the windshield opening.

The windshield assembly provides advantages when used on an aircraft. The windshield assembly extends over the windshield opening formed in the skin portion of the aircraft.

BRIEF DESCRIPTION OF THE DRAWINGS

Reference will now be made to the accompanying drawings, which are not necessarily drawn to scale, and where like reference characters designate the same or similar parts throughout the several views. In the drawings.

DETAILED DESCRIPTION

Figure 1:
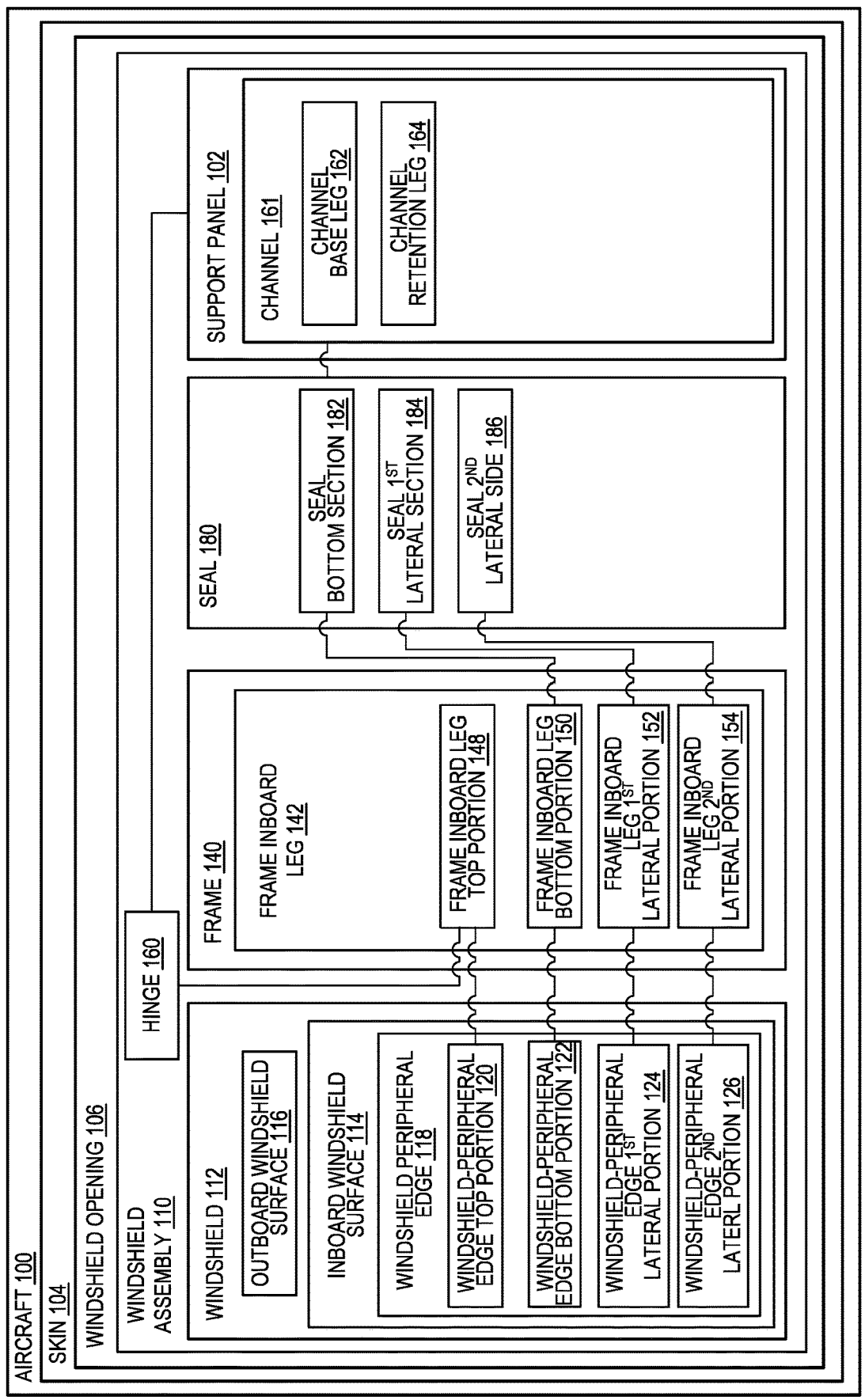
FIG. 1 is a block diagram of a windshield assembly, according to one or more examples of the subject matter, disclosed herein.

In FIG. 1, referred to above, solid lines, if any, connecting various elements and/or components may represent mechanical, electrical, fluid, optical, electromagnetic and other couplings and/or combinations thereof. As used herein, "coupled" means associated directly as well as indirectly. For example, a member A may be directly associated with a member B, or may be indirectly associated therewith, e.g., via another member C. It will be understood that not all relationships among the various disclosed elements are necessarily represented. Accordingly, couplings other than those depicted in the block diagrams may also exist. Dashed lines, if any, connecting blocks designating the various elements and/or components represent couplings similar in function and purpose to those represented by solid lines; however, couplings represented by the dashed lines may either be selectively provided or may relate to alternative examples of the subject matter, disclosed herein. Likewise, elements and/or components, if any, represented with dashed lines, indicate alternative examples of the subject matter, disclosed herein. One or more elements shown in solid and/or dashed lines may be omitted from a particular example without departing from the scope of the subject matter, disclosed herein. Environmental elements, if any, are represented with dotted lines. Virtual imaginary elements may also be shown for clarity. Those skilled in the art will appreciate that some of the features illustrated in FIG. 1 may be combined in various ways without the need to include other features described in FIG. 1, other drawing figures, and/or the accompanying disclosure, even though such combination or combinations are not explicitly illustrated herein. Similarly, additional features not limited to the examples presented, may be combined with some or all of the features shown and described herein.

Figure 17:
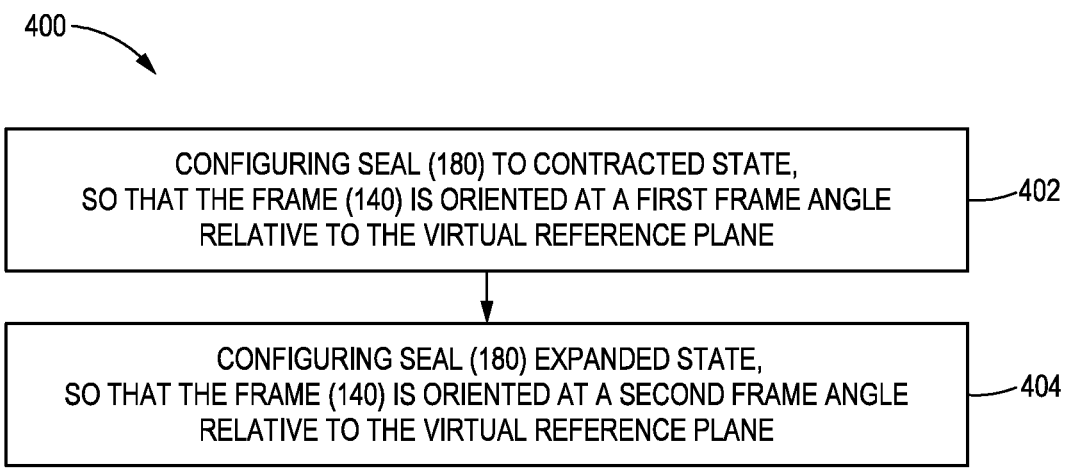
FIG. 17 is a block diagram of a method of adjusting an angle of the windshield assembly of FIG. 1, according to one or more examples of the subject matter, disclosed herein.

In FIGS. 17, referred to above, the blocks may represent operations and/or portions thereof and lines connecting the various blocks do not imply any particular order or dependency of the operations or portions thereof. Blocks represented by dashed lines indicate alternative operations and/or portions thereof. Dashed lines, if any, connecting the various blocks represent alternative dependencies of the operations or portions thereof. It will be understood that not all dependencies among the various disclosed operations are necessarily represented. FIG. 17 and the accompanying disclosure describing the operations of the methods set forth herein should not be interpreted as necessarily determining a sequence in which the operations are to be performed. Rather, although one illustrative order is indicated, it is to be understood that the sequence of the operations may be modified when appropriate. Accordingly, certain operations may be performed in a different order or simultaneously. Additionally, those skilled in the art will appreciate that not all operations described need be performed.

In the following description, numerous specific details are set forth to provide a thorough understanding of the disclosed concepts, which may be practiced without some or all of these particulars. In other instances, details of known devices and/or processes have been omitted to avoid unnecessarily obscuring the disclosure. While some concepts will be described in conjunction with specific examples, it will be understood that these examples are not intended to be limiting.

Unless otherwise indicated, the terms "first," "second," etc. are used herein merely as labels, and are not intended to impose ordinal, positional, or hierarchical requirements on the items to which these terms refer. Moreover, reference to, e.g., a "second" item does not require or preclude the existence of, e.g., a "first" or lower-numbered item, and/or, e.g., a "third" or higher-numbered item.

Reference herein to "one or more examples" means that one or more feature, structure, or characteristic described in connection with the example is included in at least one implementation. The phrase "one or more examples" in various places in the specification may or may not be referring to the same example.

As used herein, a system, apparatus, structure, article, element, component, or hardware "configured to" perform a specified function is indeed capable of performing the specified function without any alteration, rather than merely having potential to perform the specified function after further modification. In other words, the system, apparatus, structure, article, element, component, or hardware "configured to" perform a specified function is specifically selected, created, implemented, utilized, programmed, and/or designed for the purpose of performing the specified function. As used herein, "configured to" denotes existing characteristics of a system, apparatus, structure, article, element, component, or hardware which enable the system, apparatus, structure, article, element, component, or hardware to perform the specified function without further modification. For purposes of this disclosure, a system, apparatus, structure, article, element, component, or hardware described as being "configured to" perform a particular function may additionally or alternatively be described as being "adapted to" and/or as being "operative to" perform that function.

Illustrative, non-exhaustive examples of the subject matter, disclosed herein, are provided below.

Referring generally to FIG. 1 and particularly to, e.g., FIGS. 2-10 for illustrative purposes only and not by way of limitation, the following portion of this paragraph delineates example 1 of the subject matter, disclosed herein. According to example 1, windshield assembly 110 comprises support panel 102 and windshield 112, comprising inboard windshield surface 114, outboard windshield surface 116, and windshield peripheral edge 118. Inboard windshield surface 114 and outboard windshield surface 116 face in opposite directions relative to each other. Windshield peripheral edge 118 circumscribes inboard windshield surface 114 and outboard windshield surface 116. Windshield peripheral edge 118 comprises windshield-peripheral-edge top portion 120, windshield-peripheral-edge bottom portion 122, spaced away from windshield-peripheral-edge top portion 120, windshield-peripheral-edge first lateral portion 124, extending between windshield-peripheral-edge top portion 120 and windshield-peripheral-edge bottom portion 122, and windshield-peripheral-edge second lateral portion 126, spaced away from windshield-peripheral-edge first lateral portion 124 and extending between windshield-peripheral-edge top portion 120 and windshield-peripheral-edge bottom portion 122. Windshield assembly 110 also comprises frame 140, surrounding windshield peripheral edge 118 and comprising frame inboard leg 142, which is in contact with inboard windshield surface 114. Frame inboard leg 142 comprises frame-inboard-leg top portion 148, coupled to windshield-peripheral-edge top portion 120, frame-inboard-leg bottom portion 150, coupled to windshield-peripheral-edge bottom portion 122, frame-inboard-leg first lateral portion 152, coupled to windshield-peripheral-edge first lateral portion 124, and frame-inboard-leg second lateral portion 154, coupled to windshield-peripheral-edge second lateral portion 126. Frame-inboard-leg top portion 148 is linear. Windshield assembly 110 additionally comprises hinge 160, pivotally coupling frame-inboard-leg top portion 148 to support panel 102 and having a pivot axis. Windshield assembly 110 further comprises channel 161, provided in support panel 102. At least a portion of frame-inboard-leg bottom portion 150, at least a portion of frame-inboard-leg first lateral portion 152, and at least a portion of frame-inboard-leg second lateral portion 154 are located in channel 161. Channel 161 comprises channel base leg 162 and channel retention leg 164, spaced from channel base leg 162. Windshield assembly 110 also comprises seal 180, located in channel 161 between channel base leg 162 and frame inboard leg 142.

Windshield assembly 110, comprising windshield 112 that is rotatable relative to support panel 102, is provided for aircraft 100, so that an angle of windshield 112 can be adjusted depending on a mode of operation of aircraft 100.

Windshield 112 enables the environment outside of aircraft 100 to be observed from inside aircraft 100. Windshield 112 comprises inboard windshield surface 114, outboard windshield surface 116, and windshield peripheral edge 118, with inboard windshield surface 114 and outboard windshield surface 116 facing in opposite directions relative to each other. Windshield peripheral edge 118 circumscribes inboard windshield surface 114 and outboard windshield surface 116. Windshield peripheral edge 118 comprises windshield-peripheral-edge top portion 120, windshield-peripheral-edge bottom portion 122, spaced away from windshield-peripheral-edge top portion 120, windshield-peripheral-edge first lateral portion 124, extending between windshield-peripheral-edge top portion 120 and windshield-peripheral-edge bottom portion 122, and windshield-peripheral-edge second lateral portion 126, spaced away from windshield-peripheral-edge first lateral portion 124 and extending between windshield-peripheral-edge top portion 120 and windshield-peripheral-edge bottom portion 122. Each of windshield-peripheral-edge top portion 120, windshield-peripheral-edge bottom portion 122, windshield-peripheral-edge first lateral portion 124, and windshield-peripheral-edge second lateral portion 126 can have a shape that is linear, curvilinear, rectilinear, or combinations thereof.

Frame 140 reinforces windshield 112 and provides a more durable surface for interacting with adjacent components. Frame 140 surrounds windshield peripheral edge 118 and comprises frame inboard leg 142, which is in contact with inboard windshield surface 114. Frame inboard leg 142 comprises frame-inboard-leg top portion 148, coupled to windshield-peripheral-edge top portion 120, frame-inboard-leg bottom portion 150, coupled to windshield-peripheral-edge bottom portion 122, frame-inboard-leg first lateral portion 152, coupled to windshield-peripheral-edge first lateral portion 124, and frame-inboard-leg second lateral portion 154, coupled to windshield-peripheral-edge second lateral portion 126. Frame-inboard-leg top portion 148 is linear.

Hinge 160 is provided to enable frame 140 and windshield 112, coupled thereto, to rotate relative to support panel 102. Hinge 160 pivotally couples frame-inboard-leg top portion 148 to support panel 102 and has a pivot axis.

Channel 161 retains portions of frame 140 as frame pivots across a range of motion about hinge 160. More specifically, channel 161 is formed in support panel 102, and at least a portion of frame-inboard-leg bottom portion 150, at least a portion of frame-inboard-leg first lateral portion 152, and at least a portion of frame-inboard-leg second lateral portion 154 are located in channel 161. Channel 161 comprises channel base leg 162, and channel retention leg 164, spaced from channel base leg 162.

Seal 180 is located in channel 161 between channel base leg 162 and frame inboard leg 142 to limit fluid flow therebetween while accommodating rotation of frame 140 and windshield 112 about hinge 160.

Referring generally to FIG. 1 and particularly to, e.g., FIGS. 2 and 5-8 for illustrative purposes only and not by way of limitation, the following portion of this paragraph delineates example 2 of the subject matter, disclosed herein. According to example 2, which encompasses example 1, above, seal 180 is selectively configured to be either in a contracted state, so that frame-inboard-leg bottom portion 150 is spaced from channel base leg 162 by a first distance, and frame 140 is oriented at first frame angle α1 relative to virtual reference plane 163, containing the pivot axis of hinge 160, or in an expanded state, so that frame-inboard-leg bottom portion 150 is spaced from channel base leg 162 by a second distance that is different than the first distance, frame 140 is oriented at second frame angle α2 relative to the virtual reference plane 163, containing the pivot axis of hinge 160, and first frame angle α1 is different from second frame angle α2.

Seal 180 can contract or expand to accommodate different angular positions of windshield 112.

As used herein, "virtual" means having the attributes of an entity without possessing its physical form. For example, a virtual reference plane is an intangible or imaginary plane, rather than a physical one, with respect to which, e.g., location and/or orientation of other physical and/or intangible entities may be defined.

Referring generally to FIG. 1 and particularly to, e.g., FIGS. 7-8 and 11-16 for illustrative purposes only and not by way of limitation, the following portion of this paragraph delineates example 3 of the subject matter, disclosed herein. According to example 3, which encompasses example 2, above, seal 180 comprises internal chamber 192 and seal wall 190, formed of a resilient material and enclosing internal chamber 192. Seal 180 is in the contracted state when internal chamber 192 of seal 180 is at a first pressure, and seal 180 is in the expanded state when internal chamber 192 of seal 180 is at a second pressure, which is greater than the first pressure.

In one or more examples, seal 180 is formed of a resilient material to facilitate placing seal 180 in the expanded or contracted state. In one or more examples, pressurized air is supplied to internal chamber 192 of seal at a first pressure, corresponding to the contracted state, and a second pressure, greater than the first pressure, corresponding to the expanded state.

Figure 11:
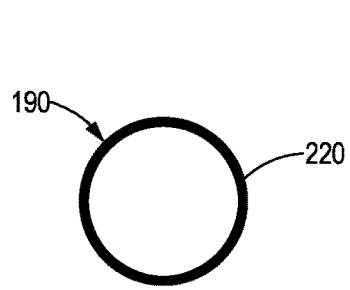
FIG. 11 is a schematic, sectional view of a first example of a seal of the windshield assembly of FIG. 1, according to one or more examples of the subject matter, disclosed herein.

Referring generally to FIG. 1 and particularly to, e.g., FIG. 11 for illustrative purposes only and not by way of limitation, the following portion of this paragraph delineates example 4 of the subject matter, disclosed herein. According to example 4, which encompasses example 3, above, seal wall 190 has circular cross-sectional shape 220.

Providing seal 180 with seal wall 190 having circular cross-sectional shape 220 facilitates manufacture of seal 180 using simple techniques while providing well-defined contact points with adjacent components.

Figure 13:
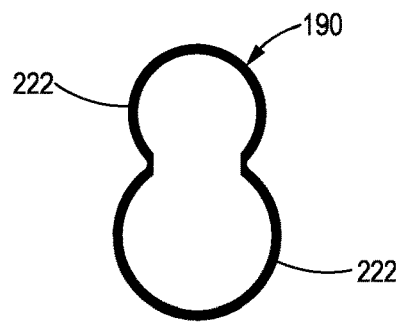
FIG. 13 is a schematic, sectional view of a third example of the seal of the windshield assembly of FIG. 1, according to one or more examples of the subject matter, disclosed herein.

Referring generally to FIG. 1 and particularly to, e.g., FIG. 13 for illustrative purposes only and not by way of limitation, the following portion of this paragraph delineates example 5 of the subject matter, disclosed herein. According to example 5, which encompasses example 3, above, seal wall 190 has a cross-sectional shape, comprising two stacked lobes 222.

Providing seal 180 with seal wall 190 having cross-sectional shape comprising two stacked lobes 222 increases a longitudinal distance that seal 180 is capable of spanning between retracted and expanded states.

Figure 12:
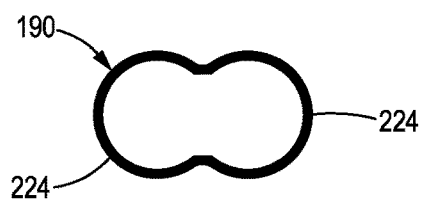
FIG. 12 is a schematic, sectional view of a second example of the seal of the windshield assembly of FIG. 1, according to one or more examples of the subject matter, disclosed herein.

Referring generally to FIG. 1 and particularly to, e.g., FIG. 12 for illustrative purposes only and not by way of limitation, the following portion of this paragraph delineates example 6 of the subject matter, disclosed herein. According to example 6, which encompasses example 3, above, seal wall 190 has a cross-sectional shape, comprising two side-by-side lobes 224.

Providing seal 180 with seal wall 190 having cross-sectional shape comprising two side-by-side lobes 224 provides multiple, well-defined contact points with adjacent components while increasing a lateral distance that seal 180 is capable of spanning.

Figure 14:
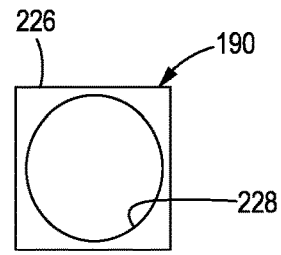
FIG. 14 is a schematic, sectional view of a fourth example of the seal of the windshield assembly of FIG. 1, according to one or more examples of the subject matter, disclosed herein.

Referring generally to FIG. 1 and particularly to, e.g., FIG. 14 for illustrative purposes only and not by way of limitation, the following portion of this paragraph delineates example 7 of the subject matter, disclosed herein. According to example 7, which encompasses example 3, above, seal wall 190 has a cross-sectional shape with square outer surface profile 226 and circular inner surface profile 228.

Providing seal 180 with seal wall 190 having cross-sectional shape comprising square outer surface profile 226 and circular inner surface profile 228 increases an area of contact between seal 180 and adjacent components.

Referring generally to FIG. 1 and particularly to, e.g., FIGS. 2 and 7-10 for illustrative purposes only and not by way of limitation, the following portion of this paragraph delineates example 8 of the subject matter, disclosed herein. According to example 8, which encompasses any one of examples 2 to 7, above, windshield assembly 110 further comprises locking pin assembly 200, configured to selectively lock frame 140 at first frame angle α1 relative to virtual reference plane 163, containing the pivot axis of hinge 160, or second frame angle α2 relative to virtual reference plane 163, containing the pivot axis of hinge 160.

Providing locking pin assembly 200, configured to selectively lock frame 140 at first frame angle α1 or second frame angle α2 relative to virtual reference plane 163, selectively secures windshield 112 at different angles suitable for particular modes of operation. Lower frame angles relative to virtual reference plane 163 have reduced drag during flight but also negatively impact visibility. Higher frame angles have increased drag but improved visibility. Locking pin assembly 200 selectively locks frame 140 in either first frame angle α1, which can be a larger frame angle to improve visibility during taxiing, take-off, and landing, or second frame angle α2, which can be a smaller frame angle to improve aerodynamics during cruising.

Referring generally to FIG. 1 and particularly to, e.g., FIGS. 2 and 7-10 for illustrative purposes only and not by way of limitation, the following portion of this paragraph delineates example 9 of the subject matter, disclosed herein. According to example 9, which encompasses example 8, above, locking pin assembly 200 comprises first locking pin 202, configured to selectively engage frame 140 at a first location when frame 140 is at first frame angle α1 relative to virtual reference plane 163, containing the pivot axis of hinge 160, and second locking pin 204, configured to selectively engage frame 140 at a second location when frame 140 is at second frame angle α2 relative to virtual reference plane 163, containing the pivot axis of hinge 160.

Providing locking pin assembly 200 with first locking pin 202 and second locking pin 204 allows windshield assembly 110 to mechanically secure frame 140 either in the first frame angle α1 or the second frame angle α2.

Figure 7:
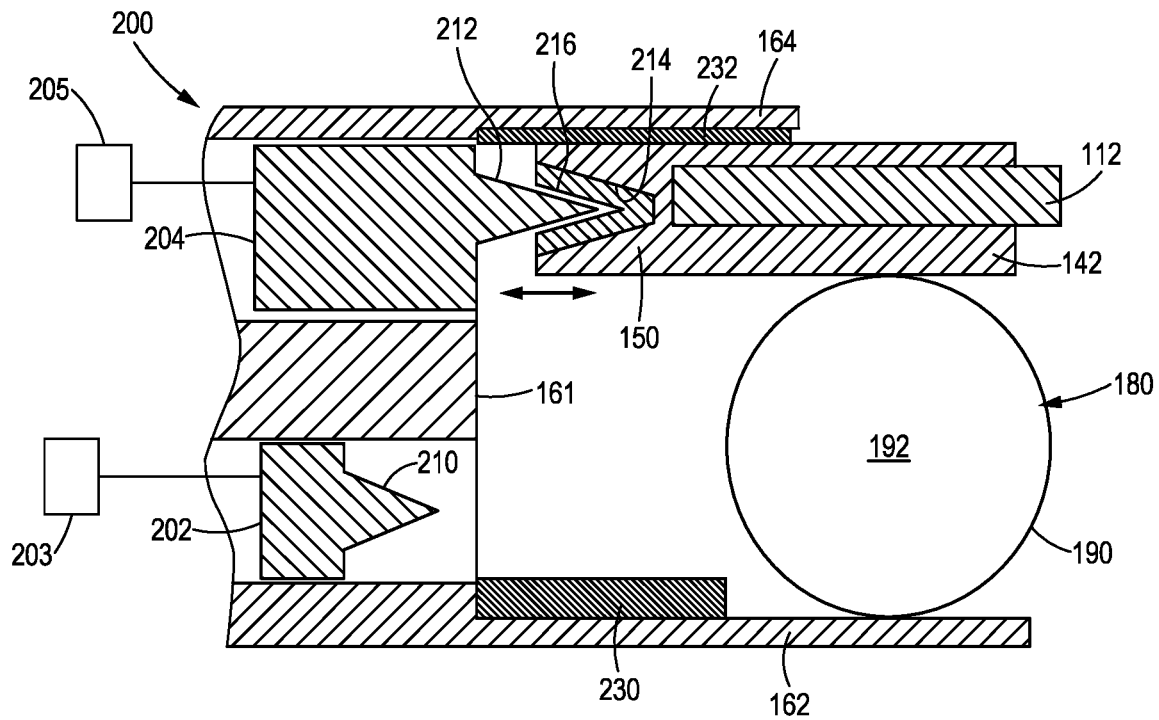
FIG. 7 is a schematic, side-elevation, sectional view of the windshield assembly of FIG. 1, according to one or more examples of the subject matter, disclosed herein.
Figure 8:
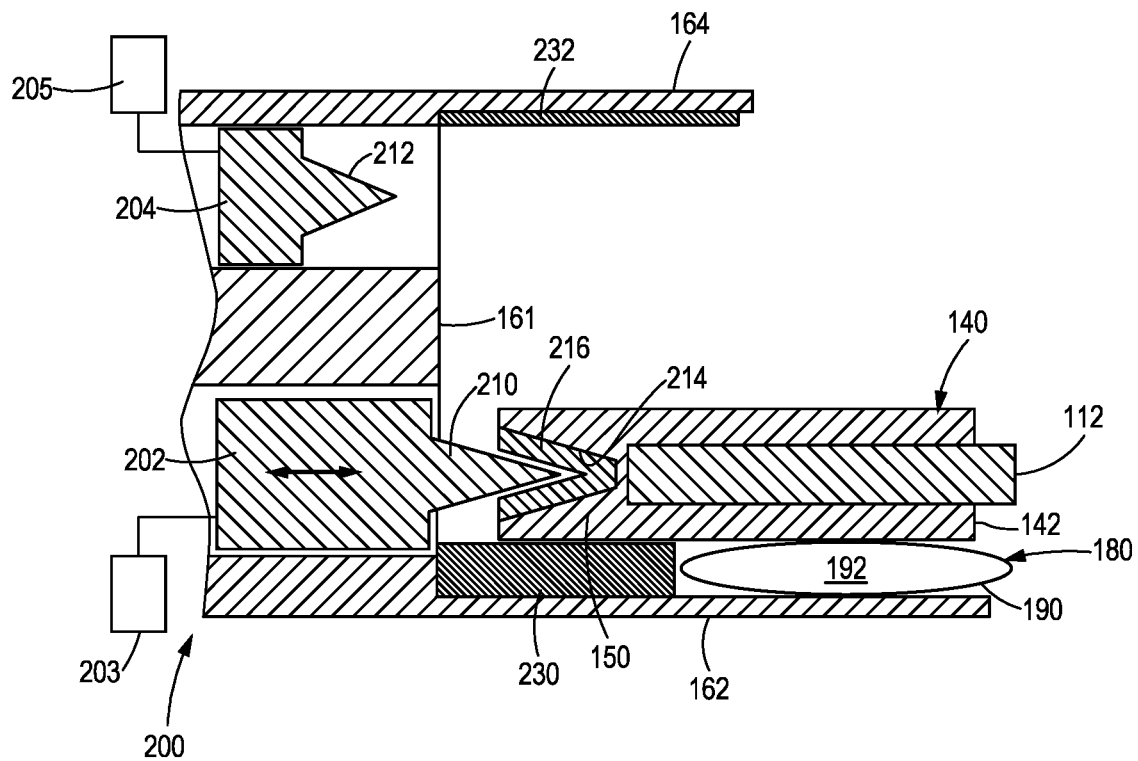
FIG. 8 is a schematic, side-elevation, sectional view of the windshield assembly of FIG. 1, according to one or more examples of the subject matter, disclosed herein.

Referring generally to FIG. 1 and particularly to, e.g., FIGS. 7 and 8 for illustrative purposes only and not by way of limitation, the following portion of this paragraph delineates example 10 of the subject matter, disclosed herein. According to example 10, which encompasses example 9, above, windshield assembly 110 further comprises first-locking-pin actuator 203, operatively coupled to first locking pin 202, and second-locking-pin actuator 205, operatively coupled to second locking pin 204.

Providing first-locking-pin actuator 203 and second-locking-pin actuator 205 permits automatic operation of first locking pin 202 and second locking pin 204, respectively.

Referring generally to FIG. 1 and particularly to, e.g., FIGS. 7 and 8 for illustrative purposes only and not by way of limitation, the following portion of this paragraph delineates example 11 of the subject matter, disclosed herein. According to example 11, which encompasses either of examples 9 or 10, above, first locking pin 202 comprises first-locking-pin head 210, second locking pin 204 comprises second-locking-pin head 212, and frame 140 defines pin receptacle 214, sized to receive portions of first-locking-pin head 210 and second-locking-pin head 212.

Providing pin receptacle 214 in frame 140, sized to receiver portion of first-locking-pin head 210 and second-locking-pin head 212, facilitates mechanical engagement of locking pin assembly 200 with frame 140.

Referring generally to FIG. 1 and particularly to, e.g., FIGS. 7 and 8 for illustrative purposes only and not by way of limitation, the following portion of this paragraph delineates example 12 of the subject matter, disclosed herein. According to example 12, which encompasses example 11, above, windshield assembly 12 further comprises pin-receptacle damping pad 216, which overlies pin receptacle 214.

Pin-receptacle damping pad 216 absorbs vibration of windshield assembly 110 during operation of aircraft 100.

Referring generally to FIG. 1 and particularly to, e.g., FIGS. 7 and 8 for illustrative purposes only and not by way of limitation, the following portion of this paragraph delineates example 13 of the subject matter, disclosed herein. According to example 13, which encompasses either of examples 11 or 12, above, a portion of first-locking-pin head 210 has a shape, complementary to a contour of pin receptacle 214, and a portion of second-locking-pin head 212 has a shape, complementary to the contour of pin receptacle 214. Providing portions of first-locking-pin head 210 and second-locking-pin head 212 with shapes complementary to a contour of pin receptacle 214 facilitates mechanical engagement between locking pin assembly 200 and frame 140 while reducing vibration of frame 140 relative to locking pin assembly 200.

Referring generally to FIG. 1 and particularly to, e.g., FIGS. 7 and 8 for illustrative purposes only and not by way of limitation, the following portion of this paragraph delineates example 14 of the subject matter, disclosed herein. According to example 14, which encompasses any one of examples 1 to 13, above, windshield assembly 110 further comprises damper 230, located between channel base leg 162 and frame 140.

Providing damper 230 between channel base leg 162 and frame 140 reduces vibrations of frame 140 relative to channel 161 when seal 180 is in the contracted state.

Referring generally to FIG. 1 and particularly to, e.g., FIGS. 7 and 8 for illustrative purposes only and not by way of limitation, the following portion of this paragraph delineates example 15 of the subject matter, disclosed herein. According to example 15, which encompasses example 14, above, windshield assembly 110 further comprises second damper 232, located between channel retention leg 164 and frame inboard leg 142.

Providing second damper 232 between channel retention leg 164 and frame inboard leg 142 reduces vibrations of frame 140 relative to channel 161 when seal 180 is in the expanded state.

Figure 3:
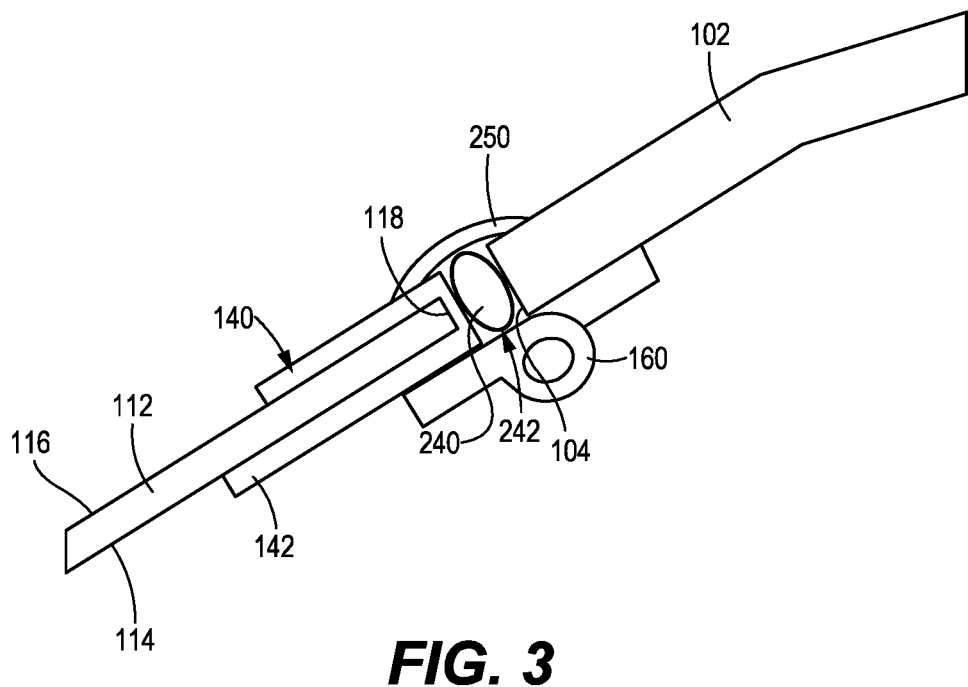
FIG. 3 is a schematic, side-elevation, sectional view of the windshield assembly of FIG. 1, according to one or more examples of the subject matter, disclosed herein.
Figure 4:
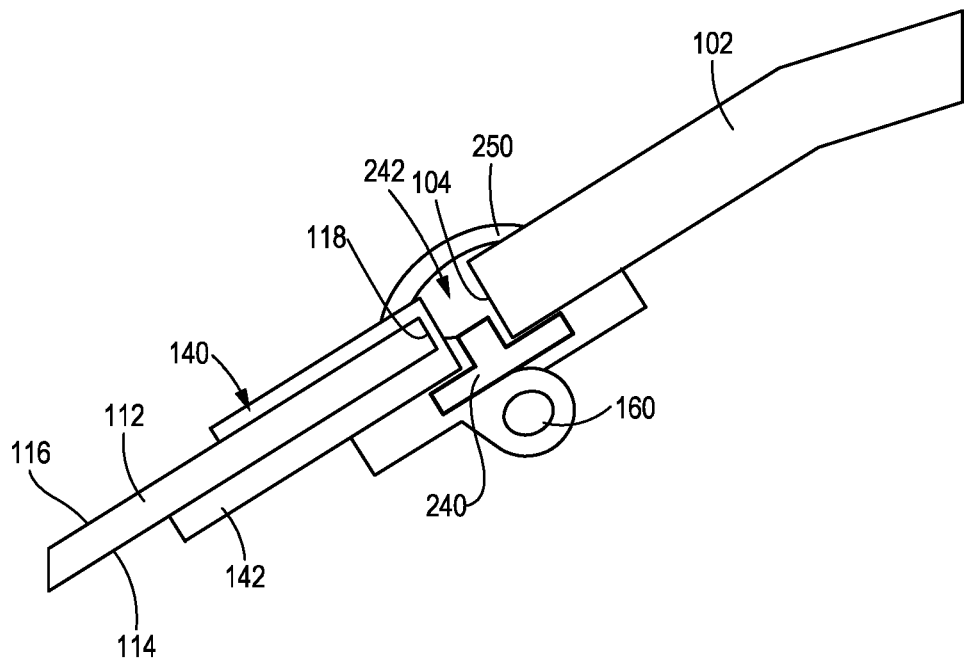
FIG. 4 is a schematic, side-elevation, sectional view of the windshield assembly of FIG. 1, according to one or more examples of the subject matter, disclosed herein.
Figure 5:
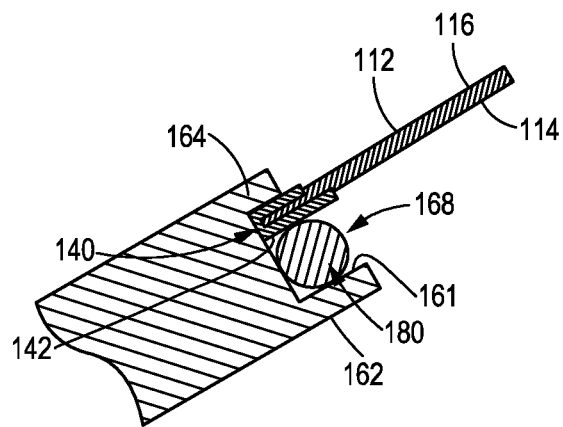
FIG. 5 is a schematic, side-elevation, sectional view of the windshield assembly of FIG. 1, according to one or more examples of the subject matter, disclosed herein.
Figure 6:
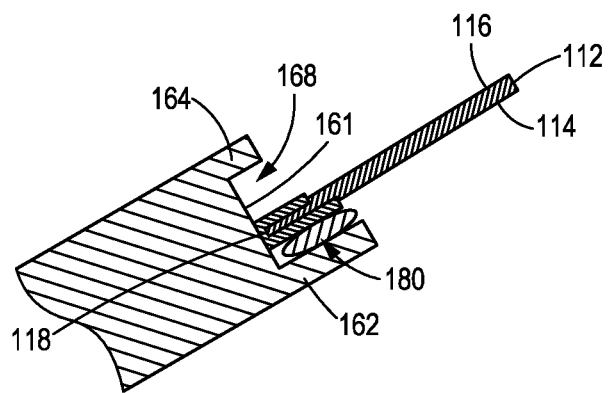
FIG. 6 is a schematic, side-elevation, sectional view of the windshield assembly of FIG. 1, according to one or more examples of the subject matter, disclosed herein.

Referring generally to FIG. 1 and particularly to, e.g., FIGS. 3 and 4 for illustrative purposes only and not by way of limitation, the following portion of this paragraph delineates example 16 of the subject matter, disclosed herein. According to example 16, which encompasses any one of examples 1 to 15, above, windshield assembly 110 further comprises water seal 240, located in gap 242 between frame 140 and support panel 102. Water seal 240 is located outboard of hinge 160.

Water seal 240 prevents ingress of water through gap 242 between frame 140 and support panel 102.

Referring generally to FIG. 1 and particularly to, e.g., FIG. 3 for illustrative purposes only and not by way of limitation, the following portion of this paragraph delineates example 17 of the subject matter, disclosed herein. According to example 17, which encompasses example 16, above, water seal 240 has an oval cross-section.

Water seal 240 having an oval cross-section provides well-defined contact points between water seal 240 and both frame 140 and support panel 102.

Referring generally to FIG. 1 and particularly to, e.g., FIG. 4 for illustrative purposes only and not by way of limitation, the following portion of this paragraph delineates example 18 of the subject matter, disclosed herein. According to example 18, which encompasses example 16, above, water seal 240 has a cross-section, comprising two portions, perpendicular to each other.

Providing water seal 240 with a cross-section, comprising two portions, perpendicular to each other, allows water seal 240 to be more securely retained in place between frame 140 and support panel 102.

Referring generally to FIG. 1 and particularly to, e.g., FIGS. 3 and 4 for illustrative purposes only and not by way of limitation, the following portion of this paragraph delineates example 19 of the subject matter, disclosed herein. According to example 19, which encompasses any one of examples 16 to 18, above, windshield assembly 110 further comprises aerodynamic seal 250, coupled to frame 140 and extending over gap 242 between frame 140 and support panel 102.

Aerodynamic seal 250 reduces drag induced by gap 242 between frame 140 and support panel 102.

Figure 2:
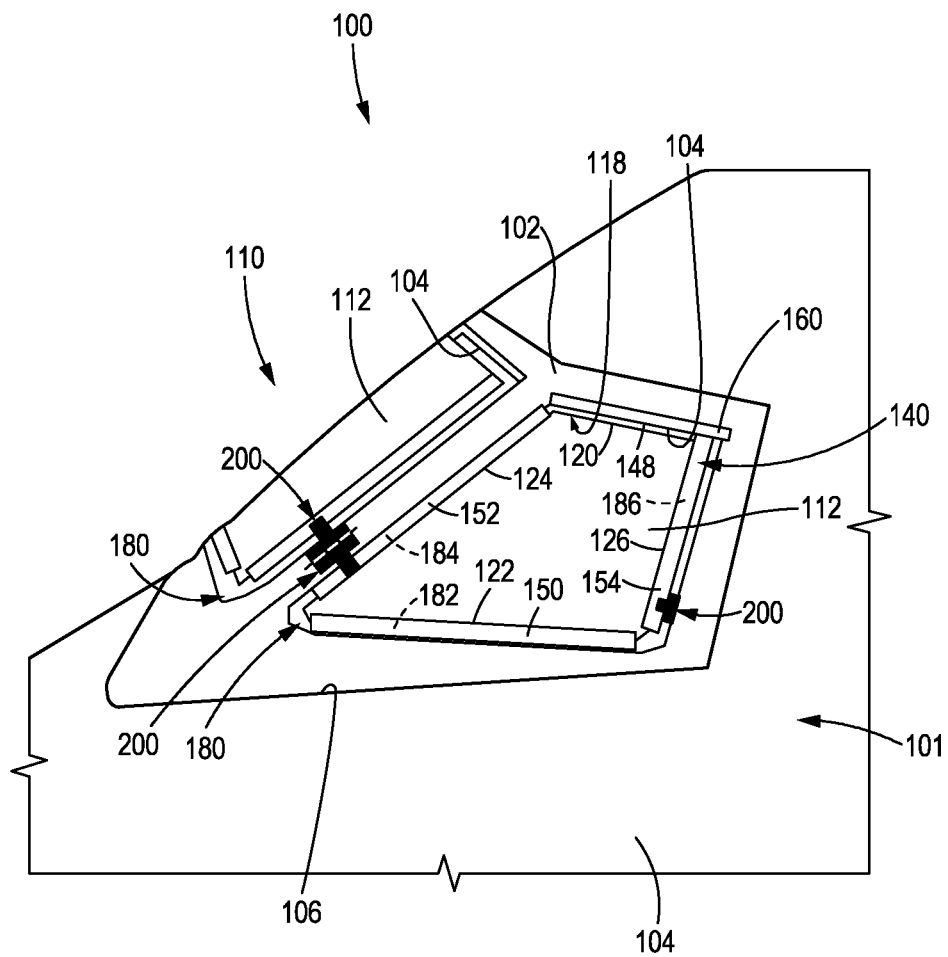
FIG. 2 is a schematic, perspective view of the windshield assembly of FIG. 1, attached to an airplane, according to one or more examples of the subject matter, disclosed herein.

Referring generally to FIG. 1 and particularly to, e.g., FIG. 2 for illustrative purposes only and not by way of limitation, the following portion of this paragraph delineates example 20 of the subject matter, disclosed herein. According to example 20, which encompasses any one of examples 1 to 19, above, seal 180 comprises seal bottom section 182, located between channel base leg 162 and frame-inboard-leg bottom portion 150, seal first lateral section 184, located between channel base leg 162 and frame-inboard-leg first lateral portion 152, and seal second lateral section 186, located between channel base leg 162 and frame-inboard-leg second lateral portion 154.

Seal 180 having seal bottom section 182, seal first lateral section 184, and seal second lateral section 186 improves sealing between frame 140 and channel 161.

Figure 9:
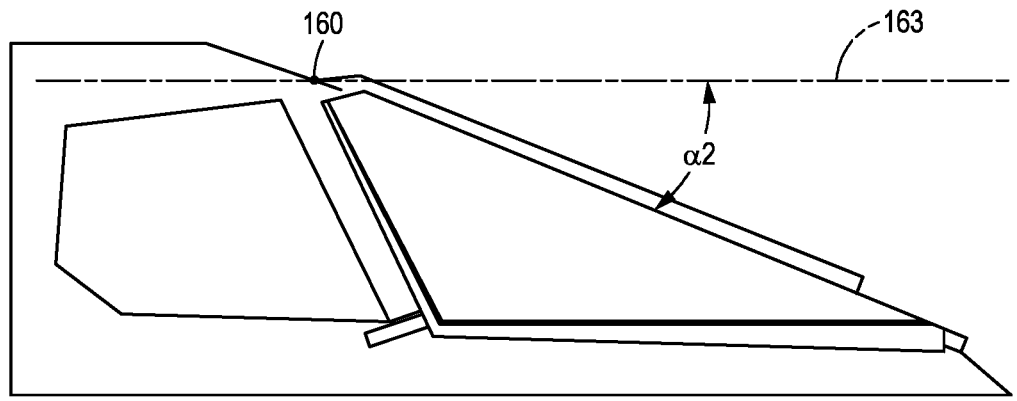
FIG. 9 is a schematic, side-elevation view of the windshield assembly of FIG. 1, according to one or more examples of the subject matter, disclosed herein.
Figure 10:
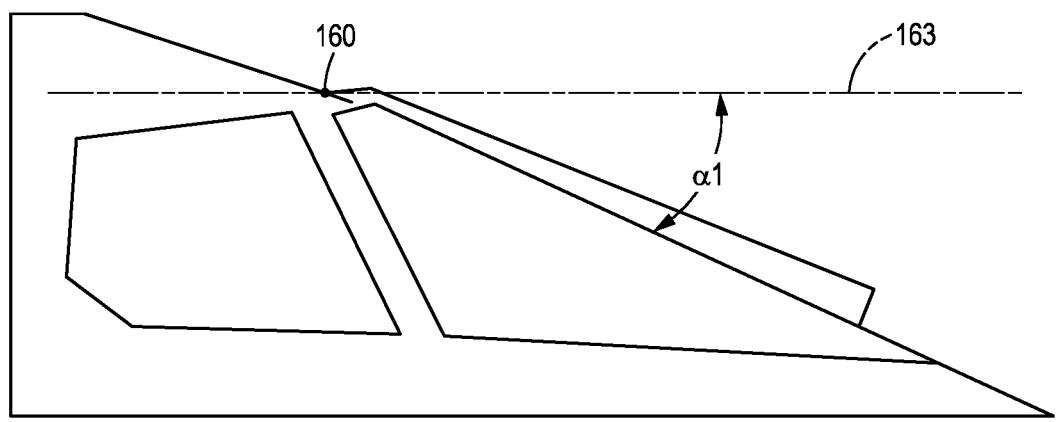
FIG. 10 is a schematic, side-elevation view of the windshield assembly of FIG. 1, according to one or more examples of the subject matter, disclosed herein.

Referring generally to FIG. 1 and particularly to, e.g., FIGS. 9, 10, and 17 for illustrative purposes only and not by way of limitation, the following portion of this paragraph delineates example 21 of the subject matter, disclosed herein. According to example 21, which encompasses example 2, above, method 400 of adjusting an angle of windshield assembly 110 comprises (block 402) selectively configuring seal 180 to the contracted state, so that frame 140 is oriented at first frame angle $\alpha 1$ relative to virtual reference plane 163, containing the pivot axis of hinge 160, or (block 404) configuring seal 180 to the expanded state, so that frame 140 is oriented at second frame angle $\alpha 2$ relative to virtual reference plane 163, containing the pivot axis of hinge 160.

Selectively configuring seal 180 to the contracted state places frame 140 in first frame angle $\alpha 1$ that improves visibility through windshield 112 during taxiing, take-off, and landing. Selectively configured seal 180 to the expanded state places frame 140 in second frame angle $\alpha 2$ that reduces drag during cruising.

Referring generally to FIG. 1 and particularly to, e.g., FIGS. 2-16 for illustrative purposes only and not by way of limitation, the following portion of this paragraph delineates example 22 of the subject matter, disclosed herein. According to example 22, which encompasses any one of examples 3 to 20, above, aircraft 100 comprises windshield assembly 110 and skin portion 104, defining windshield opening 106. Windshield assembly 110 extends over windshield opening 106.

Windshield assembly 110 provides advantages when used on an aircraft 100. Windshield assembly 110 extends over windshield opening 106 formed in skin portion 104 of aircraft 100.

Figure 15:
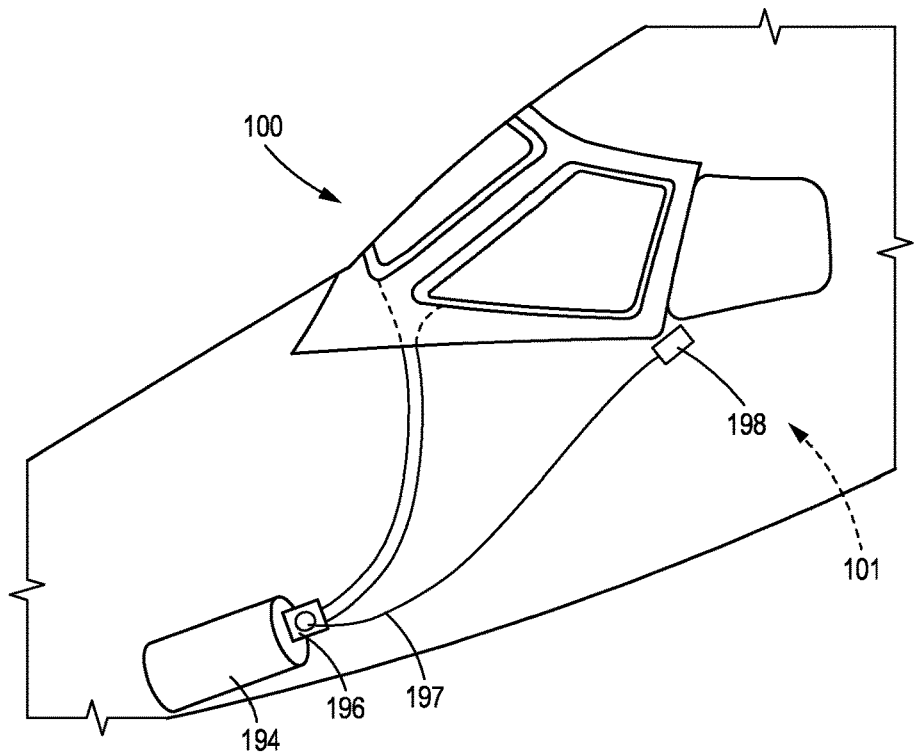
FIG. 15 is a schematic, perspective view of a source of pressurized air of the windshield assembly of FIG. 1, according to one or more examples of the subject matter, disclosed herein.
Figure 16:
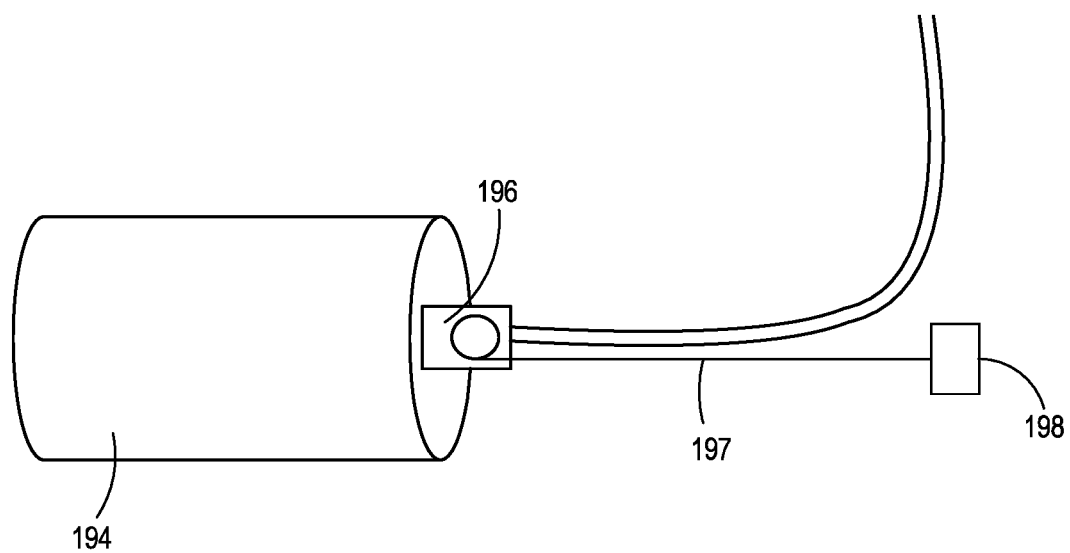
FIG. 16 is a schematic, perspective view of the source of pressurized air of FIG. 15, according to one or more examples of the subject matter, disclosed herein.

Referring generally to FIG. 1 and particularly to, e.g., FIGS. 15 and 16 for illustrative purposes only and not by way of limitation, the following portion of this paragraph delineates example 23 of the subject matter, disclosed herein. According to example 23, which encompasses example 22, above, aircraft 100 further comprises source of pressurized air 194 in fluidic communication with internal chamber 192 of seal 180.

Providing source of pressurized air 194 in fluidic communication with internal chamber 192 of seal 180 allows pneumatic operation of seal 180 between contracted and expanded states.

Referring generally to FIG. 1 and particularly to, e.g., FIGS. 15 and 16 for illustrative purposes only and not by way of limitation, the following portion of this paragraph delineates example 24 of the subject matter, disclosed herein. According to example 24, which encompasses example 23, above, source of pressurized air 194 comprises release valve 196. Aircraft 100 further comprises flight deck 101, pull cord 197, coupled to release valve 196, and handle 198, coupled to pull cord 197 and located in flight deck 101.

Providing release valve 196 on source of pressurized air 194, pull cord 197 coupled to release valve 196, and handle 198 coupled to pull cord 197 and located in flight deck 101 of aircraft 100 enables a pilot, occupying flight deck 101, to manually release pressure from seal 180 in the event of a malfunction. Manually releasing pressure from seal 180 enables windshield 112 to rotate to an angle with better visibility during certain modes of operation of aircraft 100, such as during landing.

Different examples of the apparatuses and methods disclosed herein include a variety of components, features, and functionalities. It should be understood that the various examples of the apparatuses and methods, disclosed herein, may include any of the components, features, and functionalities of any of the other examples of the apparatuses and methods disclosed herein in any combination.

Many modifications of examples, set forth herein, will come to mind of one skilled in the art, having the benefit of the teachings, presented in the foregoing descriptions and the associated drawings.

Therefore, it is to be understood that the subject matter, disclosed herein, is not to be limited to the specific examples illustrated and that modifications and other examples are intended to be included within the scope of the appended claims. Moreover, although the foregoing description and the associated drawings describe examples of the subject matter, disclosed herein, in the context of certain illustrative combinations of elements and/or functions, it should be appreciated that different combinations of elements and/or functions may be provided by alternative implementations without departing from the scope of the appended claims. Accordingly, parenthetical reference numerals in the appended claims are presented for illustrative purposes only and are not intended to limit the scope of the claimed subject matter to the specific examples provided herein.

What is claimed is:

1. A windshield assembly (110), the windshield assembly (110) comprising:
    a support panel (102);
    a windshield (112), comprising an inboard windshield surface (114), an outboard windshield surface (116), and a windshield peripheral edge (118), wherein:
        the inboard windshield surface (114) and the outboard windshield surface (116) face in opposite directions relative to each other,
        the windshield peripheral edge (118) circumscribes the inboard windshield surface (114) and the outboard windshield surface (116), and
        the windshield peripheral edge (118) comprises:
            a windshield-peripheral-edge top portion (120),
            a windshield-peripheral-edge bottom portion (122), spaced away from the windshield-peripheral-edge top portion (120),
            a windshield-peripheral-edge first lateral portion (124), extending between the windshield-peripheral-edge top portion (120) and the windshield-peripheral-edge bottom portion (122), and
            a windshield-peripheral-edge second lateral portion (126), spaced away from the windshield-peripheral-edge first lateral portion (124) and extending between the windshield-peripheral-edge top portion (120) and the windshield-peripheral-edge bottom portion (122);
    a frame (140), surrounding the windshield peripheral edge (118) and comprising a frame inboard leg (142), which is in contact with the inboard windshield surface (114), wherein the frame inboard leg (142) comprises:
        a frame-inboard-leg top portion (148), coupled to the windshield-peripheral-edge top portion (120),
        a frame-inboard-leg bottom portion (150), coupled to the windshield-peripheral-edge bottom portion (122),
        a frame-inboard-leg first lateral portion (152), coupled to the windshield-peripheral-edge first lateral portion (124), and
        a frame-inboard-leg second lateral portion (154), coupled to the windshield-peripheral-edge second lateral portion (126), wherein the frame-inboard-leg top portion (148) is linear;
    a hinge (160), pivotally coupling the frame-inboard-leg top portion (148) to the support panel (102) and having a pivot axis;
    a channel (161) in the support panel (102), wherein:
        at least a portion of the frame-inboard-leg bottom portion (150), at least a portion of the frame-inboard-leg first lateral portion (152), and at least a portion of the frame-inboard-leg second lateral portion (154) are located in the channel (161), and
        the channel (161) comprises:
            a channel base leg (162) and
            a channel retention leg (164), spaced from the channel base leg (162); and
    a seal (180), located in the channel (161) between the channel base leg (162) and the frame inboard leg (142); wherein the seal (180) is selectively configured to be either:
    in a contracted state, so that the frame-inboard-leg bottom portion (150) is spaced from the channel base leg (162) by a first distance, and the frame (140) is oriented at a first frame angle ($\alpha 1$) relative to a virtual reference plane (163), containing the pivot axis of the hinge (160), or
    in an expanded state, so that the frame-inboard-leg bottom portion (150) is spaced from the channel base leg (162) by a second distance that is different than the first distance, the frame (140) is oriented at a second frame angle ($\alpha 2$) relative to the virtual reference plane (163), containing the pivot axis of the hinge (160), and the first frame angle ($\alpha 1$) is different from the second frame angle ($\alpha 2$).

2. The windshield assembly (110) according to claim 1, wherein:
    the seal (180) comprises an internal chamber (192) and a seal wall (190), formed of a resilient material and enclosing the internal chamber (192);
    the seal (180) is in the contracted state when the internal chamber (192) of the seal (180) is at a first pressure; and the seal (180) is in the expanded state when the internal chamber (192) of the seal (180) is at a second pressure, which is greater than the first pressure.

3. The windshield assembly (110) according to claim 2, wherein the seal wall (190) has a circular cross-sectional shape (220).

4. The windshield assembly (110) according to claim 2, wherein the seal wall (190) has a cross-sectional shape, comprising two stacked lobes (222).

5. The windshield assembly (110) according to claim 1, further comprising a locking pin assembly (200), configured to selectively lock the frame (140) at the first frame angle (α1) relative to the virtual reference plane (163), containing the pivot axis of the hinge (160), or the second frame angle (α2) relative to the virtual reference plane (163), containing the pivot axis of the hinge (160).

6. The windshield assembly (110) according to claim 5, wherein the locking pin assembly (200) comprises:
a first locking pin (202), configured to selectively engage the frame (140) at a first location when the frame (140) is at the first frame angle (α1) relative to the virtual reference plane (163), containing the pivot axis of the hinge (160); and
a second locking pin (204), configured to selectively engage the frame (140) at a second location when the frame (140) is at the second frame angle (α2) relative to the virtual reference plane (163), containing the pivot axis of the hinge (160).

7. The windshield assembly (110) according to claim 6, further comprising:
a first-locking-pin actuator (203), operatively coupled to the first locking pin (202); and
a second-locking-pin actuator (205), operatively coupled to the second locking pin (204).

8. The windshield assembly (110) according to claim 6, wherein:
the first locking pin (202) comprises a first-locking-pin head (210);
the second locking pin (204) comprises a second-locking-pin head (212); and
the frame (140) defines a pin receptacle (214), sized to receive portions of the first-locking-pin head (210) and the second-locking-pin head (212).

9. The windshield assembly (110) according to claim 8, further comprising a pin-receptacle damping pad (216), overlying the pin receptacle (214).

10. The windshield assembly (110) according to claim 8, wherein:
a portion of the first-locking-pin head (210) has a shape, complementary to a contour of the pin receptacle (214), and
a portion of the second-locking-pin head (212) has a shape, complementary to the contour of the pin receptacle (214).

11. An aircraft (100), comprising:
the windshield assembly (110) according to claim 2; and
a skin portion (104), defining a windshield opening (106), wherein the windshield assembly (110) extends over the windshield opening (106).

12. A method (400) of adjusting an angle of the windshield assembly (110) according to claim 1, the method (400) comprising selectively configuring the seal (180) to the contracted state, so that the frame (140) is oriented at the first frame angle (α1) relative to the virtual reference plane (163), containing the pivot axis of the hinge (160), or to the expanded state, so that the frame (140) is oriented at the second frame angle (α2) relative to the virtual reference plane (163), containing the pivot axis of the hinge (160).

13. The windshield assembly (110) according to claim 1, further comprising a damper (230), located between the channel base leg (162) and the frame (140).

14. The windshield assembly (110) according to claim 13, further comprising a second damper (232), located between the channel retention leg (164) and the frame inboard leg (142).

15. The windshield assembly (110) according to claim 1, further comprising a water seal (240), located in a gap (242) between the frame (140) and the support panel (102), wherein the water seal (240) is located outboard of the hinge (160).

16. The windshield assembly (110) according to claim 15, wherein the water seal (240) has an oval cross-section.

17. The windshield assembly (110) according to claim 15, wherein the water seal (240) has a cross-section, comprising two portions, perpendicular to each other.

18. The windshield assembly (110) according to claim 15, further comprising an aerodynamic seal (250), coupled to the frame (140) and extending over the gap (242) between the frame (140) and the support panel (102).

19. The windshield assembly (110) according to claim 1, wherein the seal (180) comprises:
a seal bottom section (182), located between the channel base leg (162) and the frame-inboard-leg bottom portion (150),
a seal first lateral section (184), located between the channel base leg (162) and the frame-inboard-leg first lateral portion (152), and
a seal second lateral section (186), located between the channel base leg (162) and the frame-inboard-leg second lateral portion (154).

* * * * *